United States Patent [19]

Tatemoto et al.

[11] 4,260,698

[45] Apr. 7, 1981

[54] CO-CROSSLINKABLE BLEND COMPOSITION COMPRISING IODINE-CONTAINING FLUOROELASTOMER

[75] Inventors: Masayoshi Tatemoto, Osaka; Masayasu Tomoda, Otsu; Yutaka Ueta, Uenonishi, all of Japan

[73] Assignee: Daikin Kogyo Co., Ltd., Osaka, Japan

[21] Appl. No.: 81,895

[22] Filed: Oct. 4, 1979

[30] Foreign Application Priority Data

Oct. 7, 1978 [JP] Japan ................... 53/123861

[51] Int. Cl.³ ....................... C08L 27/20; C08L 27/24
[52] U.S. Cl. .................... 525/102; 525/104; 525/188; 525/193; 525/194; 525/199; 525/331; 525/355
[58] Field of Search ............. 525/102, 104, 331, 193, 525/194, 199, 188

[56] References Cited

U.S. PATENT DOCUMENTS 3,538,028 11/1970 Morgan .................................. 260/23

FOREIGN PATENT DOCUMENTS 2815187 10/1978 Fed. Rep. of Germany ........... 525/331

Primary Examiner—Wilbert J. Briggs, Sr.
Attorney, Agent, or Firm—Birch, Stewart, Kolasch & Birch

[57] ABSTRACT

A co-crosslinkable blend composition which comprises (1) an iodine-containing fluoroelastomer, (2) at least one of silicone oligomers, silicone elastomers, fluorosilicone elastomers, phosphonitrilic fluoroelastomers, tetrafluoroethylene/propylene copolymers and hexafluoropropylene/ethylene copolymers and (3) an organic peroxide.

8 Claims, No Drawings

CO-CROSSLINKABLE BLEND COMPOSITION COMPRISING IODINE-CONTAINING FLUOROELASTOMER

The present invention relates to a co-crosslinkable blend composition comprising an iodine-containing fluoroelastomer.

It is well known that conventional fluoroelastomers such as vinylidene fluoride/chlorotrifluoroethylene copolymer, vinylidene fluoride/hexafluoropropylene copolymer, vinylidene fluoride/hexafluoropropylene/tetrafluoroethylene copolymer and tetrafluoroethylene/propylene copolymer are crosslinkable with organic peroxides. However, the crosslinked rubber products can not be provided with good quality unless strictly and sufficiently controlled conditions are chosen on the crosslinking. In addition, the crosslinked rubber products are large in compression set so that they are hardly usable as sealing materials. In order to overcome such defect, there have been made some proposals for enhancement of the crosslinkability. For instance, the application of dehydrohalogenation or the use of diene monomers results in introduction of olefinic bonds into the molecules so that crosslinkable groups or bonds are increased. However, the increase of crosslinkable groups or bonds causes the deterioration of heat resistance and oil resistance, which are the characteristic properties of fluoroelastomers. In addition, the crosslinkability of the resulting products is not sufficiently satisfactory.

For the purpose of providing a fluorinated elastomeric polymer which is readily crosslinkable with an organic peroxide while maintaining good heat resistance and oil resistance inherent to fluoroelastomers, an extensive study has been made. As the result, it has now been found that a certain specific iodine-containing fluoroelastomer has good properties suitable for the said purpose. The iodine-containing fluoroelastomer is quite characteristic in being readily and equally crosslinkable not only with a polyamine or an aromatic polyhydroxy compound but also with an organic peroxide under ordinary conditions. Due to its excellent crosslinkability with an organic peroxide, such iodine-containing fluoroelastomer is usable as a co-crosslinkable blend composition with any conventional elastomer without any difficulty. This is a great advantage as scarcely seen in conventional fluoroelastomers.

According to the present invention, there is provided a co-crosslinkable blend composition comprising (1) an iodine-containing fluoroelastomer, (2) at least one of silicone oligomers, silicone elastomers, fluorosilicone elastomers, phosphonitrilic fluoroelastomers, tetrafluoroethylene/propylene copolymers and hexafluoropropylene/ethylene copolymers and (3) an organic peroxide.

The term "iodine-containing fluoroelastomer" as the component (1) is intended to mean a fluoroelastomer containing iodine atoms bonded therein in a content of 0.001 to 10% by weight, preferably of 0.01 to 5% by weight. When the fluorine content is less than 0.001% by weight, the crosslinking property of the iodine-containing fluoroelastomer is insufficient. When the fluorine content is more than 10% by weight, the heat resistance is inferior. A typical example of such an iodine-containing fluoroelastomer is a copolymer of vinylidene fluoride with at least one other fluoroolefin copolymerizable therewith, the copolymer having an iodine atom bonded therein. The iodine-containing fluoroelastomer can be produced, for instance, by copolymerizing vinylidene fluoride with at least one other fluoroolefin in the presence of a radical producing source and an iodinated compound of the formula: $RfI_x$ wherein Rf is a saturated or unsaturated fluorohydrocarbon or chlorofluorohydrocarbon group and x indicates the number of the bonds of Rf which is at least 1, preferably 1 or 2 (cf. U.S. Pat. No. 4,158,678; Ser. No. 894,256, filed Apr. 7, 1978). Examples of the said other fluoroolefins are tetrafluoroethylene, chlorotrifluoroethylene, trifluoroethylene, vinyl fluoride, hexafluoropropene, pentafluoropropene, perfluoro(methyl vinyl ether), perfluoro(ethyl vinyl ether), perfluoro(propyl vinyl ether), etc.

Among the components (2), the term "silicone elastomer" is intended to mean a silicone polymer based on a structure consisting of alternate silicon and oxygen atoms with two organic radicals (e.g. vinyl) attached to each silicon. More detailed explanations on this term may be noted by reference to "Encyclopedia of Polymer Science and Technology", Vol. 12, page 531 et seq. (1970), published by John Wiley & Sons, Inc. The term "silicone oligomer" may be defined substantially in the same manner as "silicone elastomer" but having a lower molecular weight in comparison with "silicone elastomer". Usually, it has a siloxane chain including not less than 3 silicon atoms. Further, at least one organic radical attached to each silicon should be or have a vinyl group. The presence of such vinyl group is effective in improvement of the crosslinkability. The term "fluorosilicone elastomer" may be defined in the similar manner to "silicone elastomer" but wherein at least one organic radical attached to each silicon is fluorinated. The term "phosphonitrilic fluoroelastomer" is intended to mean a semi-inorganic polymer that contains alternating phosphorus and nitrogen atoms in the backbone with two substituents on each phosphorus atom, at least one of the substituents being a fluorine atom or a fluorine-containing group. The term "tetrafluoroethylene/propylene copolymer" is intended to mean a polymer comprising units of tetrafluoroethylene and of propylene, preferably in a molar ratio of 99:1 to 10:90. The term "hexafluoropropylene/ethylene copolymer" is intended to mean a polymer comprising units of hexafluoropropylene and of ethylene, favorably in a molar ratio of 50:50 to 10:90.

Although there is no exact limit on the amount of the polymer as the component (2) to be incorporated, it may be usually from 5 to 100 parts by weight, preferably from 10 to 60 parts by weight, to 100 parts by weight of the iodine-containing fluoroelastomer as the component (1).

As the organic peroxide which is the component (3), there may be preferably employed any one which can easily produce a peroxy radical by heat or in the presence of an oxidation-reduction system. Examples of the organic peroxide are 1,1-bis(t-butylperoxy)-3,5,5-trimethylcyclohexane, 2,5-dimethylhexane-2,5-dihydroxyperoxide, di-t-butylperoxide, t-butylcumylperoxide, dicumyl peroxide, α,α'-bis(t-butylperoxy)-p-diisopropylbenzene (hereinfter referred to as "Peroxymon F-40"), 2,5-dimethyl-2,5-di(t-butylperoxy)hexane, 2,5-dimethyl-2,5-di(t-butylperoxy)hexyne-3 (hereinafter referred to as "Perhexyne 2,5B-40"), benzoyl peroxide, t-butylperoxybenzene, 2,5-dimethyl-2,5-di(benzoylperoxy)hexane, t-butylperoxymaleic acid, t-butylperoxyisopropyl carbonate, etc. Among them, those of the dialkyl type are preferred. The amount of the organic peroxide as the component (3) to be incorporated may be appropriately decided depending on the content of active dioxy bonds, the decomposition temperature, etc. It is usually from 0.05 to 10 parts by weight, preferably from 1 to 5 parts by weight, to 100 parts by weight of the iodine-containing fluoroelastomer as the component (1).

In addition to the said three essential components, there may be optionally incorporated any conventional additive(s). For instance, a crosslinking coagent and/or a co-crosslinking agent may be incorporated therein so as to enhance the crosslinkability. As the crosslinking coagent and/or the co-crosslinking agent, there may be used any one reactive to a peroxy radical and a polymer radical. Specific examples are diallyl phthalate, triallyl cyanurate, triallyl isocyanurate, triacryl formal, triallyl trimellitate, N,N'-m-phenylenebismaleimide, dipropargyl terephthalate, divinylbenzene, divinylspirodioxane, tetraallyloxyethane, tetraallyl terephthalamide, divinylsilane, etc. Their amount may be usually from 0.1 to 10 parts by weight, preferably from 0.5 to 5 parts by weight, to 100 parts by weight of the combined amount of the iodine-containing fluoroelastomer as the component (1) and the polymer as the component (2).

Further, for instance, an acid accepting agent may be incorporated into the blend composition. As the acid accepting agent, there may be used any divalent metal oxide or hydroxide such as oxides and hydroxides of Ca, Mg, Pb and Zn. Double salts of these metals are also usable. These materials are effective in enhancement of crosslinkability, mechanical properties, heat resistance, etc.

Furthermore, for instance, a coupling agent may be incorporated therein. Examples of the coupling agent are vinyl group-containing silicone oligomers, fluorinated vinyl group-containing silicone oligomers, etc. These materials can introduce between different kinds of polymers chemical bonds due to the reactivity of the vinyl group so that the compatibility of those polymers is enhanced.

Moreover, for instance, carbon black, silica, metal oxides, processing agents, plasticizers, etc. may be incorporated into the blend composition.

The blend composition of the present invention can be readily crosslinked and cured under ordinary conditions as conventionally adopted for crosslinking to give a co-crosslinked product excellent in elasticity at low temperature and solvent-resistance property.

Practical and presently preferred embodiments of this invention are illustratively shown in the following Examples.

REFERENCE EXAMPLE 1

Into an autoclave having an inner volume of 36.6 liters, deionized water (15 liters) was charged, and the air in the autoclave was replaced by a gaseous mixture of vinylidene fluoride and hexafluoropropylene (65:35 by mol). Then, the gaseous mixture (1100 g) was admitted therein. The inner temperature was elevated up to 80° C. while stirring. Ammonium persulfate (25.6 g) was dissolved in the deionized water, and isopentane (0.2 g) was introduced therein by the aid of nitrogen gas, whereby polymerization started. An aqueous solution of ammonium persulfate having a concentration of 161 g/liter was introduced therein at a rate of 1 ml/min so that the concentration of the undecomposed ammonium persulfate in the reaction system was kept constant. Likewise, isopentane was introduced therein at a rate of 0.0046 g/minute so as to keep the concentration of the unreacted isopentane constant. Since the pressure was lowered with the progress of the polymerization, a gaseous mixture of vinylidene fluoride and hexafluoropropylene (78:22 by mol) was introduced therein from time to time so that the pressure was kept at 12 kg/cm$^2$G. After 185 minutes, heating and stirring were stopped, and the monomers in the autoclave were released. From the resulting dispersion, a copolymer (4760 g) was recovered. When determined in methyl ethyl ketone, the intrinsic viscosity [$\eta$] was 0.66 (dl/g, 35° C.), and the Mooney viscosity (ML$_{1+20}$ 140° C.) was 20.

REFERENCE EXAMPLE 2

Into a reaction tank having an inner volume of 3000 ml, deionized water (1500 ml) and ammonium perfluorooctanoate (7.5 g) were charged, and the air in the tank was replaced by a gaseous mixture of vinylidene fluoride and hexafluoropropylene (45:55 by mol). Then, the gaseous mixture was introduced therein so as to make an inner pressure of 14 kg/cm$^2$G. An iodinated compound (I(CF$_2$CF$_2$)$_2$I) (0.3 ml at 25° C.) was added thereto, the temperature was elevated up to 80° C., and a 0.2% aqueous solution of ammonium persulfate (10 ml) was admitted therein. After an induction time of about 0.5 hour, the pressure started to decrease. When the pressure was lowered to 15 kg/cm$^2$G, a gaseous mixture of vinylidene fluoride and hexafluoropropylene (78:22 by mol) was introduced therein so as to keep the pressure constant during the polymerization. After 20 hours, the temperature and the pressure were quickly lowered to stop the polymerization. The produced dispersion has a solid concentration of about 25% by weight. The dispersion was treated with a 1% aqueous solution of potassium alum, and the coagulated product was washed with water and dried to give a rubbery material having an iodine content of 0.13% by weight. When determined in methyl ethyl ketone, the intrinsic viscosity [$\eta$] was 0.84, and the Mooney viscosity (ML$_{1+20}$ 140° C.) was 43.

EXAMPLES 1 TO 9 AND COMPARATIVE EXAMPLES 1 TO 6

According to the prescriptions as shown in Table 1, designed amounts of materials were blended by the use of a roll, followed by press vulcanization. The obtained test piece was subjected to measurement of physical properties in the manner as defined in JIS (Japanese Industrial Standard) K6301. The results are shown in Table 1, from which it is understood that the blend composition of the invention is favorably improved in mechanical properties and fuel oil resistance and drawbacks at low temperature.

TABLE 1

| | Example 1 | Example 2 | Example 3 | Example 4 | Example 5 | Example 6 | Example 7 | Example 8 | Example 9 | Comparative Example 1 | Comparative Example 2 | Comparative Example 3 | Comparative Example 4 | Comparative Example 5 | Comparative Example 6 |
|---|---|---|---|---|---|---|---|---|---|---|---|---|---|---|---|
| Conventional fluoroelastomer*1 | 85.9 | 85.6 | 58 | 50 | 50 | 49 | 81 | 60 | | | | | | 100 | 58 |
| Iodine-containing fluoroelastomer*2 | | | | | | | | | | | | | | | |
| Polymer as component (2)*3 | KE-575u | KE-582u | KE-582u | LS.63u | LS.63u | PNF-230 | PNF-230 | EF | 100 Vinyl silicone | KE-575u | LS.63u | PNF-230 | EF | | KE-582u |
| | 14.1 | 14.4 | 42 | 50 | 50 | 51 | 19 | 40 | | 100 | 100 | 100 | 100 | | 42 |
| SRF carbon black*4 | 1 | 1 | 0.6 | 1 | 1 | 0.5 | 1 | 1 | 5.6 | | | | | | 5 |
| Activator CF*5 | 6 | 6 | 1.2 | 6 | 6 | 1 | 6 | 6 | | | | | | | TEDA 0.3 |
| Crosslinking agent*6 | | | | | | | | | | | | | | | |
| Perhexyne 2,5B-40 | 2 | 2 | | 2 | 2 | | | | | 5 | 2 | | 5 | 4 | |
| Peroximon F-40 | | | 5 | | | 5 | 5 | 5 | 5 | | | 5 | | | 2.2 |
| Crosslinking coagent | | | | | | | | | | | | | | | |
| TAIC*7 | 1.5 | 1.5 | 1.5 | 2 | 0.5 | 0.8 | 2 | 2 | — | 1.5 | 1.5 | — | 2 | 4 | 1.0 |
| MgO No. 150*8 | 3 | 3 | 3 | 3 | 3 | — | — | — | — | — | — | — | 3 | 3 | 3 |
| Crosslinkability (determined by JSR Type Curastometer (manufactured by Japan Synthetic Rubber Co., Ltd.)/Mold Chamber No. 1; Frequency, 6 cpm, ±3°; 160° C.) | | | | | | | | | | | | | | | |
| Minimum viscosity (kg) | 0.41 | 0.42 | 0.31 | 0.28 | 0.40 | 0.31 | 0.48 | 0.18 | 0.27 | | 1.3 | | | 0.32 | 0.22 |
| Degree of vulcanization (kg) | 3.07 | 3.05 | 3.08 | 3.16 | 2.20 | 1.66 | 2.77 | 2.10 | 3.88 | | 6.8 | | | 0.87 | 2.38 |
| Induction time (min.) | 1.7 | 1.5 | 1.2 | 1.7 | 1.6 | 1.5 | 1.2 | 2.0 | 1.2 | | | | | Bub- | 1.5 |
| Optimum vulcanizing time (min.) | 6.1 | 5.5 | 5.0 | 6.8 | 10.0 | 19.0 | 11.4 | 20.0 | 3.8 | | | | | bled; | 10.5 |
| Press cure (°C. × min.) | 160 | 160 | 160 | 160 | 160 | 160 | 160 | 160 | 160 | | 150 | 170 | Bub- | pro- | 170 |
| | ×30 | ×30 | ×30 | ×30 | ×30 | ×30 | ×30 | ×30 | ×30 | 150×30 | 150 | ×60 | bled; | duc- | ×60 |
| Oven cure (°C. × hr.) | 150 ×6 | 150 ×6 | 150 ×6 | 150 ×6 | 150 ×6 | — | — | 150 ×6 | 150 ×6 | 150 ×6 | ×6 | — | pro- duction of test piece im- possible | tion of test piece im- possible | 150 ×6 |
| Physical properties in atmosphere | | | | | | | | | | | | | | | |
| 100% Stretching stress (kg/cm²) | 22 | 23 | 36 | 43 | 23 | 38 | 42 | 40 | 32 | 37 | 26 | 39 | Bubbled; | | 48 |
| Tensile strength (kg/cm²) | 141 | 148 | 110 | 73 | 64 | 62 | 105 | 152 | 172 | 72 | 95 | 89 | production of test piece impossible | | 97 |
| Elongation (%) | 590 | 600 | 360 | 300 | 500 | 190 | 300 | 200 | 500 | 150 | 300 | 180 | | | 220 |
| Hardness (JIS, Hs) | 67 | 66 | 72 | 74 | 64 | 65 | 73 | 75 | 75 | 85 | 60 | 53 | | | 76 |
| Oil resistance (determined after dipping at 40° C. for 70 hours in Fuel B (isooctane:toluene = 70:30 by volume)) | | | | | | | | | | | | | | | |
| Volume swell (%) | +17.8 | +18.2 | +57.2 | +11.7 | +14.2 | +12.3 | +10.2 | −53.1 | −6.7 | 100 | +19.0 | +28 | | | +81.2 |
| Low temperature resistance | | | | | | | | | | | | | | | |
| Gehman torsional test T50 (°C.) | −22.7 | −22.5 | −41.7 | −34.5 | −26.4 | −27.8 | | −28.2 | −20.0 | −70.0 | −70.0 | −65.6 | | | −31.0 |
| Brittleness temperature by impact (°C.) | −27.0 | −27.6 | −48.8 | −30.2 | −24.8 | | | | −15.4 | | | | | | −24.6 |

Note:
*1Fluoroelastomer obtained in Reference Example 1.
*2Iodine-containing fluoroelastomer obtained in Reference Example 2.
*3Examples 1, 2 and 3 and Comparative Examples 1 and 6, silicone elastomer manufactured by Shin-Etsu Chemical Co., Ltd.; Examples 4 and 5 and Comparative Example 2, fluorosilicone elastomer manufactured by Toray Silicone Co., Ltd.; Examples 6 and 7 and Comparative Example 3, phosphonitrilic fluoroelastomer manufactured by Firestone Tire & Rubber Co.; Example 8 and Comparative Example 4, ethylene/hexafluoropropylene copolymer (hexafluoropropene units, 15%; SG 1.20; DSC Tg 50° C.); Example 9, oligomer obtained by hydrolysis of dichloromethylvinylsilane in ice water and containing 50% of the n = 4 polymeric material.
*4"Seast S" manufactured by Tokai Carbon Co., Ltd.
*5Ca(OH)₂ manufactured by Bayer A.G.
*6Perhexyne 2,5B-40 and Peromixon F-40, organic peroxides manufactured by Nippon Oil & Fats Co., Ltd.
*7TAIC, triallyl isocyanurate.
*8MgO No. 150, manufactured by Kyowa Chemical Co., Ltd.

What is claimed is:

1. A co-crosslinkable blend composition which comprises (1) an iodine-containing fluoroelastomer, (2) at least one member selected from the group consisting of silicone oligomers, silicone elastomers, fluorosilicone elastomers, phosphonitrilic fluoroelastomers, tetrafluoroethylene/propylene copolymers and hexafluoropropylene/ethylene copolymers and (3) an organic peroxide.

2. The blend composition according to claim 1, wherein the iodine-containing fluoroelastomer has an iodine content of 0.001 to 10% by weight.

3. The blend composition according to claim 2, wherein the iodine-containing fluoroelastomer has an iodine content of 0.01 to 5% by weight.

4. The blend composition according to claim 1, wherein the iodine-containing fluoroelastomer has as the main constituent a copolymeric chain consisting essentially of vinylidene fluoride and at least one other fluoroolefin.

5. The blend composition according to claim 4, wherein the other fluoroolefin is selected from the group consisting of tetrafluoroethylene, chlorotrifluoroethylene, trifluoroethylene, vinyl fluoride, hexafluoropropene, pentafluoropropene, perfluoro(methyl vinyl ether), perfluoro(ethyl vinyl ether) and perfluoro(propyl vinyl ether).

6. The blend composition according to claim 1, which further comprises a divalent metal oxide or hydroxide.

7. The blend composition according to claim 1, which further comprises a polyallyl or polyvinyl compound.

8. The blend composition according to claim 1 which contains from 5 to 100 parts by weight, based on 100 parts by weight of the iodine-containing fluoroelastomer, of the component (2) member.

* * * * *